United States Patent Office 3,242,194
Patented Mar. 22, 1966

3,242,194
THENYL GUANIDINES
Eric Walton and Graham Keith Ruffell, London, England, assignors to Burroughs Wellcome & Co. (U.S.A.) Inc., Tuckahoe, N.Y., a corporation of New York
No Drawing. Filed Apr. 18, 1962, Ser. No. 188,544
Claims priority, application Great Britain, Apr. 20, 1961, 14,275/61
2 Claims. (Cl. 260—329)

The present invention relates to guanidines, to the methods for preparing them and to pharmaceutical compositions containing them.

It has been found that guanidines of Formula I and the acid addition salts thereof selectively depress sympathetic nerve function and have little or no effect on the parasympathetic or central nerve functions, and are, therefore, useful in the treatment of hypertension.

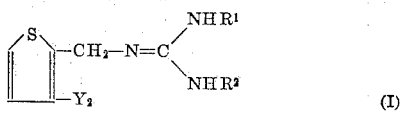

(I)

In Formula I:

$Y^2$ is a hydrogen atom or a methyl group; and $R^1$ and $R^2$ are the same or different and each is a hydrogen atom or a methyl or ethyl group.

The activity of the guanidines of Formula I and the acid addition salts thereof resides in the bases. For the salts, the acid used is of no consequence, though preferably it is pharmacologically and pharmaceutically acceptable; for example, it may be hydrochloric, hydrobromic, sulphuric, lactic, citric, tartaric, succinic, oxalic, p-toluenesulphonic or maleic acid.

The present invention in one aspect, therefore, provides the therapeutically acceptable acid addition salts of the guanidines of Formula I.

The preferred guanidines of Formula I are those in which $R^1$ is a methyl group, and especially those in which $R^1$ and $R^2$ are both methyl groups. The particularly preferred guanidine is N,N'-dimethyl-N''-3-methyl-2-thenylguanidine.

The guanidines of Formula I and the acid addition salts thereof are conveniently prepared by the reaction of a thenylamine or a salt thereof with an S-substituted isothiourea or a salt thereof. The acid addition salts of the guanidines of Formula I produced by the above described reaction may be converted into other salts. For example, the hydrochlorides may be prepared from the hydriodides by reaction with silver chloride or by warming with methanolic hydrogen chloride.

The guanidines of Formula I and the acid addition salts thereof may be presented with an acceptable carrier therefor in pharmaceutical compositions made by any method which comprises the admixture of the components. For oral administration, fine powders or granules of the guanidine or salt thereof may contain diluents and dispersing and surface active agents, and may be presented in a draft in water or in a syrup; in capsules or cachets in the dry state or in a non-aqueous suspension, when a suspending agent may be included; in tablets when binders and lubricants may be included; or in a suspension in water or a syrup or an oil, or in a water/oil emulsion, when flavouring preserving, suspending, thickening and emulsifying agents may be included; the granules or the tablets may be coated. For parenteral administration, the guanidine or salt thereof may be presented in aqueous or non-aqueous injection solutions which may contain antioxidants buffers, bacteriostats and solutes which render the compound isotonic with the blood; or in aqueous suspensions when suspending agents and thickening agents may be included; extemporaneous injection solutions may be made from sterile pills, granules or tablets which may contain diluents, dispersing and surface active agents, binders and lubricants. The guanidine or salt thereof may also be presented in suppositories or passaries by incorporation in a suppository base.

The dose range of the guanidines of Formula I and the acid addition salts thereof suitable for administration depends on a number of variable factors such as the activity and toxicity of the particular guanidine or salt thereof, the mode and frequency of administration and the method of making the composition. The dose range is, however, generally from 5 mg. to 500 mg. For continuous medication, dosing two or three times a day is usually desirable.

The present invention in another aspect, therefore, provides a process for the treatment of hypertension which comprises the administration of a therapeutically acceptable acid addition salt of a guanidine of Formula I.

The invention will now be described with reference to the following examples, in which all temperatures are given in degrees centigrade.

Example 1

A mixture of 2-thenylamine (2.4 g.), N,N',S-trimethylisothiourea hydriodide (5.24 g.) and ethanol (10 ml.) was refluxed for 2¼-hours. After evaporation to dryness in vacuo, the residue was crystallised from n-propanol/ether, and further purified by triturating with ice-cold water, filtering and recrystallising from n-propanol/ether giving N,N'-dimethyl-N''-2-thenylguanidine hydriodide, M.P. 175–178°.

Example 2

A mixture of 2-thenylamine (2.26 g.) and N-ethyl-N', S-dimethylisothiourea hydriodide (5.2 g.) and ethanol (10 ml.) was refluxed for 3½ hours. After evaporation to dryness in vacuo, the residue was washed with ether and crystallised from a little water. Recrystallisation from n-propanol/ether gave N-ethyl-N'-methyl-N''-2-thenylguanidine hydriodide, M.P. 116–117°.

Example 3

Ether solutions of 2-thenylamine (7.18 g.) and methylisothiocyanate (4.64 g.) were mixed, and after 2 hours, N - methyl - N'-2-thenylthiourea was filtered off. After crystallising from n-propanol/ether, it melted at 86–90°. This thiourea (8.45 g.) was gently warmed with methyl iodide (7.1 g.) and n-propanol (20 ml.) to start the exothermic reaction. After refluxing for 5 minutes and cooling, N,S - dimethyl - N' - 2 - thenylisothiourea hydriodide crystallised, M.P. 159–161°.

The isothiourea (3.28 g.) was warmed with 0.880 ammonia (25 ml.) for 2¾ hours and then evaporated to dryness in vacuo. The residual oil was washed with ether and treated with n-propanol/ether to give a little unchanged N,S-dimethyl-N'-2-thenylisothiourea hydriodide. Solvents were removed from the filtrate, and the residual oil was dissolved in dilute hydrochloric acid and washed with ether. The clear acid solution was basified with excess concentrated sodium hydroxide solution, and extracted well with ether. The ether extracts were concentrated and acidified with ethereal oxalic acid solution. The precipitate was collected, crystallised twice from n-propanol/ether and once from n-butanol to give N-methyl-N'-2-thenylguanidine hydrogen oxalate hemihydrate, M.P. 85–87°.

Example 4

Ether solutions of 3-methyl-2-thenylamine (6.55 g.) and methylisothiocyanate (3.76 g.) were mixed and warmed to start the gentle reaction. An oil separated and crystallised slowly on cooling and standing. This crude N-methyl-N'-3-methyl-2-thenylthiourea (8.1 g.) was mixed with methyl iodide (5 ml.) and n-propanol (20 ml.)

and refluxed for 10 minutes. Excess methyl iodide was distilled off and the residue crystallised on cooling, to give N,S-dimethyl-N'-3-methyl-2-thenylisothiourea hydriodide, M.P. 135–138°.

The isothiourea (2.56 g.) was warmed with 27% aqueous methylamine solution (10 ml.); further methylamine was added after ½ hour (5 ml.), and after another ½ hour (10 ml.). The total heating time was 2½ hours. Evaporation to dryness in vacuo and crystallisation of the oil from water once, and n-propanol/ether once, gave N,N'-dimethyl-N''-3-methyl-2-thenylguanidine hydriodide, M.P. 153–157°.

*Example 5*

N,S-dimethyl-N'-3-methyl-2-thenylisothiourea hydriodide (2.56 g.) was warmed with 0.880 ammonia (10 ml.); further ammonia was added after ½ hour (5 ml.), and after another ½ hour (5 ml.). At the end of a further 1¼ hours heating, the mixture was evaporated to dryness in vacuo and dissolved in dilute hydrochloric acid; the solution was washed with ether. The base was liberated with excess concentrated sodium hydroxide solution and extracted into ether. Excess succinic acid was added to these extracts and the precipitate recrystallised from n-propanol/ether to give N-methyl-N'-3-methyl-2-thenylguanidine hydrogen succinate, M.P. 145–146°.

*Example 6*

N,S-dimethyl-N'-3-methyl-2-thenylisothiourea hydriodide (2.56 g.) was heated on a steam bath with 33% aqueous ethylamine (20 ml.) for 2½ hours and then evaporated to dryness in vacuo. After washing with ether the oil crystallised from water. Recrystallisation from water gave N-ethyl-N'-methyl-N''-3-methyl-2-thenylguanidine hydriodide, M.P. 97–99°.

*Example 7*

Tablets (0.555 g.) of N,N'-dimethyl-N''-2-thenylguanidine hydriodide were made by mixing the salt (0.25 g.) in a fine powder with lactose (0.25 g.) and starch (0.05 g.), granulating the mixture with alcohol or alcoholic polyvinyl pyrrolidone or a mixture of equal parts of alcohol and water, drying the granules at 40°, adding magnesium stearate (0.005 g.) as a lubricant, and compressing the mixture.

*Example 8*

Tablets (0.505 g.) of N,N'-dimethyl-N''-2-thenylguanidine hydriodide were made by granulating the salt (0.5 g.) in a fine powder with equal parts of alcohol and water. Magnesium stearate (0.005 g.) as a lubricant was added, and the mixture compressed directly.

*Example 9*

Injection solutions containing N,N'-dimethyl-N''-2-thenylguanidine hydriodide in water of injection (0.2 g. per ml.) were made by autoclaving the solution at 15 lb. steam pressure for 30 minutes in unit dose ampoules or multidose containers. For the latter, the water for injection contained benzyl alcohol (1.0%), phenol (0.5%) or chlorocresol (0.1%).

We claim:
1. A thenylguanidine selected from the class consisting of N,N'-dimethyl-N''-2-thenylguanidine, N,N'-dimethyl-N''-3-methyl-2-thenylguanidine and N-methyl-N'-3-methyl-N'-3-methyl-2-thenylguanidine, and a salt of said thenylguanidine with a therapeutically acceptable acid.

2. A therapeutically acceptable acid addition salt of N-methyl-N'-3-methyl-2-thenylguanidine.

References Cited by the Examiner

UNITED STATES PATENTS

| | | | |
|---|---|---|---|
| 2,367,702 | 1/1945 | Van Zeeren | 260—329 |
| 2,533,798 | 12/1950 | Hartough et al. | 260—329 |
| 2,545,423 | 3/1951 | Duerr et al. | 260—564 |
| 3,037,910 | 6/1962 | Copp et al. | 167—65 |
| 3,067,101 | 12/1962 | Easton et al. | 167—65 |

OTHER REFERENCES

Alles et al.: J. Pharmacol. and Exp. Therapeut., vol. 72 (1941), p. 265.
Bernthsen: A Textbook of Organic Chemistry, 1941 Ed., p. 656.
Boura et al.: Nature, vol. 191 (1961), pp. 312–13.
Chemical Abstracts, vol. 47, p. 3923d (1953).
Harwood Chemical Abstracts, vol. 27 (1933), p. 1676.

WALTER A. MODANCE, *Primary Examiner.*

FRANK CACCIAPAGLIA, JR., NICHOLAS S. RIZZO, *Examiners.*